(12) United States Patent
Oppliger et al.

(10) Patent No.: US 8,534,455 B2
(45) Date of Patent: Sep. 17, 2013

(54) TRANSPORTING DEVICE FOR CONVEYING PRINTED PRODUCTS

(75) Inventors: Jean-Claude Oppliger, Niederhasli (CH); Michael Landolt, Oftringen (CH); Tony Kluser, Luzern (CH)

(73) Assignee: Muller Martini Holding AG, Hergiswil (CH)

( * ) Notice: Subject to any disclaimer, the term of this patent is extended or adjusted under 35 U.S.C. 154(b) by 390 days.

(21) Appl. No.: 12/949,354

(22) Filed: Nov. 18, 2010

(65) Prior Publication Data

US 2011/0114456 A1  May 19, 2011

(30) Foreign Application Priority Data

Nov. 18, 2009 (CH) ..................... 1780/09

(51) Int. Cl.
*B65G 17/40* (2006.01)

(52) U.S. Cl.
USPC ....................................... 198/852

(58) Field of Classification Search
USPC ............... 198/850–852, 833, 644
See application file for complete search history.

(56) References Cited

U.S. PATENT DOCUMENTS

| | | | |
|---|---|---|---|
| 3,952,860 A * | 4/1976 | Specht | 198/701 |
| 4,638,906 A | 1/1987 | Winiasz | |
| 5,137,144 A * | 8/1992 | Uehara | 198/822 |
| 6,615,977 B2 * | 9/2003 | Kilby et al. | 198/838 |
| 7,404,549 B2 * | 7/2008 | Meier et al. | 270/52.14 |
| 2003/0168323 A1 * | 9/2003 | Frost | 198/852 |

FOREIGN PATENT DOCUMENTS

| | | |
|---|---|---|
| CH | 588 647 A5 | 6/1977 |
| CH | 593 187 | 8/1977 |
| CH | 646 762 A5 | 12/1984 |
| CH | 656 683 A5 | 7/1986 |
| CH | 683 989 A5 | 6/1994 |
| DE | 15 56 234 A1 | 2/1970 |
| DE | 10 2006 008657 A1 | 8/2007 |
| EP | 1194 A1 * | 3/1979 |
| EP | 0 540 866 A2 | 9/1992 |
| EP | 1 557 387 A1 | 7/2005 |
| EP | 1 832 532 A2 | 2/2007 |

OTHER PUBLICATIONS

International Search Report in CH 1780/09, dated Apr. 12, 2010 and English Translation.

* cited by examiner

*Primary Examiner* — Mark A Deuble

(74) *Attorney, Agent, or Firm* — Venable LLP; Robert Kinberg (57) ABSTRACT

A transport device for conveying printed products. The transport device includes a conveying chain. The conveying chain includes at least two functional units arranged sequentially along a conveying section and connected to each other by a connecting element. Each functional unit includes a first chain link and a second chain link. The first and second chain links are operatively connected to one another and differing in their respective functions.

24 Claims, 9 Drawing Sheets

TRANSPORTING DEVICE FOR CONVEYING PRINTED PRODUCTS

CROSS-REFERENCE TO RELATED APPLICATION

This application claims the priority of Swiss Patent Application No. 01780/09, filed on Nov. 18, 2009, the entirety of which is hereby incorporated by reference.

BACKGROUND

1. Field of Invention

The invention relates to a transport device for conveying printed products, wherein the transport device includes a conveying chain configured for a predetermined section and composed of a number of functional units that can be connected to each other.

2. Related Art

Conveying chains of this type are used for transporting printed products between individual processing stations, such as inserting machines, addressing units, adhesive-application apparatuses or the like. For this, the printed products are generally held in place by grippers mounted on the chain links and, if applicable, are released by these grippers at the processing stations. To ensure a continuous operation, the links of the conveying chain are normally driven so as to circulate continuously along the conveying section. The conveying chain is guided along the conveying section with the aid of suitable guide arrangements or guide rails which can also determine the curves of the conveying section. To ensure mobility along the conveying section, the chain links must be connected articulated, meaning so as to pivot independently around two axes, wherein the conveying section can have a length of 100 m or more. As a result, the installation of the guide rail arrangement and the chain links is correspondingly involved, wherein the articulated connection between the individual chain links must be ensured over the complete length of the conveying chain.

For the conveying chains described in Swiss patent document CH 588 647 A5, the installation of the chain links connected via spherical joints is to be facilitated by embodying the joint sockets and joint members as equatorial spherical segments. The idea of equatorially divided spherical segments is also picked up in Swiss patent documents CH 646 762 A5 and CH 656 683 A5. However, this type of design for articulated connections between individual chain links does not substantially facilitate the installation of the conveying chains on or in the guide rails.

Some degree of simplification is proposed for the installation of conveying chains as disclosed in Swiss patent document CH 593 187, for which the chain links made of plastic are detachably connected with the aid of pivoting axes and hubs that are oriented transverse to their longitudinal direction, wherein additional components are attached, so as to be detachable, to fastening elements of the chain links. However, the installation of the chain links on or in the guide rail arrangements or in the guide rails still presents considerable problems, even with the conveying chains described in this document. Somewhat easier is the installation of conveying chains as disclosed in U.S. Pat. No. 4,638,906 for which the individual chain links can be detached from each other by turning them around an axis extending parallel to the conveying direction wherein, however, the guide rail must be provided for this with corresponding openings.

The installation of a conveying chain as described in European patent document EP 1 832 532 A2 is to be made easier by having the bearing housing rest on two bearing housing parts which bridge a spherical bearing element to form a spherical joint. The idea of dividing the bearing elements into equatorial planes is again taken up in this document.

Finally, it is proposed in European patent document EP 1 557 387 A1 to make available cost-effective conveying chains by attaching to each link of the chain at least two clamps or grippers which respectively grip one printed product.

The above-provided explanations for the known chains used for conveying printed products show that considerable problems are encountered during the installation of said conveying chains along a conveying section which is predetermined by a guide rail arrangement while simultaneously ensuring a sufficient mobility for the conveying chain along a curved conveying section.

SUMMARY

The invention is intended to remedy this problem. It is an object of the invention, as characterized in the claims, to propose a design for a transport device of the aforementioned type which is distinguished by its simplicity and which above all can be produced cost-effectively. It is furthermore an object of the invention to decisively extend the service life of a conveying chain formed with a number of chain links and to minimize the noise developing during the operation.

According to an embodiment of the invention, a transport device for conveying printed products is provided. The transport device includes a conveying chain. The conveying chain includes at least two functional units arranged sequentially along a conveying section and connected to each other by a connecting element. Each functional unit includes a first chain link and a second chain link. The first and second chain links are operatively connected to one another and differing in their respective functions.

According to another embodiment, the conveying chain is composed of at least two functional units, essentially arranged sequentially along the conveying section, that the sequentially arranged functional units form a rigid and/or an articulated connection, that the respective functional unit consists of a first chain link and a second chain link which differ in their function and are operatively connected, that in order to form the conveying chain the functional units are configured congruent or quasi-congruent or the like in their sequence or that the functional units are configured different with respect to functionality, and that the sequentially arranged functional units are provided with means or connecting elements for creating a detachable connection or a conditionally detachable connection caused by traction and/or a non-detachable connection.

The conveying chain includes a number of so-called conveying units and that each conveying unit in turn comprises a first chain link and a second chain link, wherein it is specified at the same time that the individual conveying units are also operatively connected to each other, regardless of the type of connection that is used between the individual elements.

The otherwise required physical mobility of the conveying chain along a curved conveying section can be ensured for conveying chains according to embodiments of the invention by using functional units to form the conveying chain which functional units can either be connected rigid or articulated to each other. The connection options between the links that form the functional unit are discussed in further detail below. During the installation of the conveying chains according to embodiments of the invention, it is possible to produce conveying chain segments comprising a number of joint arrangements and/or conveying chain arrangements ahead of time and to insert these into a guide rail arrangement. Adjacent functional units can then be connected rigidly to form the conveying chain. The installation is thus on the whole made noticeably simpler because the articulated connections, required for ensuring the functional safety of the conveying chain, can already be produced along with the conveying chain at the production location and because only rigid connections between the individual functional units must be formed during the installation at the location of installation.

In view of the different functions to be met by respectively two chain links, for example the drive function and the guide function, it has proven useful if the functional unit created by connecting two chain links consists of a chain link embodied as a first functional link and a different chain link embodied as a second functional link since this allows assigning individual functions to individual chain links which, on the whole, results in a functional improvement and/or an improvement of the operational reliability for the conveying chains according to embodiments of the invention. To form a rigid connection between the individual chain links of a functional unit, it has proven useful if these chain links can engage form-locking in a connecting region, in particular if they can interlock, wherein the form-locking connection can be secured with the aid of a detachable connecting element. A similar or identical connection can also be provided between the functional units.

The connection between the individual chain links, relative to the sequentially adjacent links, can be realized with the aid of hook-shaped projections that extend transverse to the conveying direction and interlink for the form-locking connection. In the process, the connecting region for one of the chain links can overlap the connecting region for the other chain link as seen in conveying direction and thus produce a secure connection. The connecting element in particular can take the form of a screw bolt that extends through a recess provided in one of the chain links and is screwed into a thread provided in the other chain link, wherein the screw bolt advantageously fits with its head, arranged opposite the thread, at least indirectly against a chain link.

During the installation of the conveying chains according to an embodiment of the invention, the individual chain links of a functional unit can therefore initially be positioned by interlocking them in the connecting region and can then be secured in this position with the connecting element. It has turned out that the installation of conveying chains according to an embodiment of the invention can be realized particularly easily if the axis of the screw bolt extends transverse, especially perpendicular, to the conveying direction since this arrangement makes it possible to provide an especially large space for installation options, especially installation openings, in the guide rail arrangements. Slot-shaped openings of this type which extend in conveying direction of the guide rail arrangement are already required in the functional devices used for conveying the printed products in guide rail arrangements, such as grippers and clamps. Starting from the conveying chain, these extend in a direction transverse to the conveying direction and must be freely accessible outside of the guide rails.

In view of this arrangement of the functional devices and considering the desired easy installation, it has proven to be especially useful if, on the side facing away from the thread, the screw bolt for connecting the chain links extends through a connecting device for connecting a functional unit extending transverse to the conveying section, e.g. a gripper, a clamp, or the like. The connecting device as component of the functional device can be fixedly connected thereto. In view of the frequently desired high modularity of systems provided with conveying chains according to embodiments of the invention, it has proven favorable if the connecting device forms an adapter which can be used for connecting the functional device to the conveying chain, wherein different connecting devices or adapters can be used for connecting different functional devices.

As previously addressed in the above, the use of chain links that differ from each other is particularly helpful considering the desired optimization of the individual functions of the conveying chain. In this connection, it has proven useful if the first chain link is provided with a region for connecting the conveying chain to a drive unit and if the second chain link is provided with a guide device for guiding the conveying chain along a guide rail arrangement. As compared to standard drive units, such as the ones disclosed in European patent document EP 0 540 866 A2, which engage in the region of the guide arrangements in the conveying chains and subject the guide elements to increased wear because of the simultaneous drive function, the inventive arrangement results in an improvement in the operational reliability of conveying chains as a result of the aforementioned separation between the conveying function on the one hand and the guide function on the other hand.

In addition, the standard drive unit for conveying chains requires an intervention in the conveying arrangement in the area of the guiding devices, meaning in the area of the guide rails or the guide rail arrangement, and in many cases also requires that the conveying chain is looped around a drive element. With the separation of the connecting region for the conveying device on the one hand and the guiding device on the other hand, the chain drive can be realized completely separate from the guiding function and the conveying function for the printed products. As a result, a further functional optimization is achieved.

In view of providing an especially large area for installing the functional devices to be attached to the conveying chain, it has proven especially useful if the connecting region for the drive unit is arranged on the side of the functional arrangement opposite the bolt head which is used for connecting the functional device, if applicable via a connecting device, so that with functional devices that are suspended below the conveying chain, such as grippers, the drive unit can be arranged above the conveying chain and cooperates with the connecting regions which in this position extends upward and away from the conveying chain.

The connecting region can be realized particularly easily if it takes the shape of a comb, having teeth that extend transverse, in particular approximately perpendicular, to the conveying direction. The chain bolts of a drive chain can then engage in the spaces between the teeth for the purpose of driving the conveying chain. This design also does not require the conveying chain to be looped around a drive wheel. Rather, the conveying chain can also be driven along a straight-line segment of the conveying section. However, it is useful in that case if the conveying chain is supported on the side opposite the conveying device on or in a guide rail arrangement. The guide arrangement of the second chain link in this case is usefully provided with one, preferably two, three or more guide rollers which are positioned so as to rotate relative to the respective roller axes. The desired functional separation between the drive function on the one hand and the guide function on the other hand can be achieved especially effectively if all guide rollers are arranged on the side facing a device for connecting a functional unit, such as a gripper, in the region designed for connecting the drive unit, so as to allow free access to the connecting region outside of the guide rollers.

Even though the guide rollers can be arranged on the second chain link in such a way that they are offset along the conveying direction, it has proven useful in view of the most compact design possible for the conveying chains according to an embodiment of the invention if two guide rollers are arranged so as to rotate relative to a joint first roller axis which extends transverse and especially perpendicular to the conveying section and/or the conveying direction, wherein two additional guide rollers are positioned so as to rotate around a joint second roller axis, relative to a plane that is positioned transverse, especially approximately perpendicular, and is defined by the conveying direction and the first roller axis. To obtain a symmetrical design, the guide rollers can also be arranged on the sides of a cuboid, wherein the roller axes extend along its median lines.

According to an embodiment of the invention and in view of providing a particularly reliable guide function for guide rail arrangements which can comprise curved regions in all spatial directions, it has proven especially useful if the device for guiding the respective chain link comprises at least four guide rollers, wherein respectively two guide rollers are positioned rotating relative to a joint roller axis, and the two roller axes are arranged perpendicular to each other in one plane. For the purpose of a compact design, it has proven especially useful if at least one guide roller is positioned rotating on a guide pin used for the second functional link because the desired guiding function can thus be realized without actual continuous roller axes, wherein the rotating positioning can be ensured with respect to a joint geometric roller axis even if additional functional regions are located between individual regions of the second functional element which are designed for the rotating positioning of the guide rollers.

In the same way as for the traditional conveying chains, the links of the articulated arrangement for conveying chains according to an embodiment of the invention can also pivot around two pivoting axes extending transverse, especially approximately perpendicular, to each other in order to provide the mobility along curved guides which are delimited only by their curvature radius. The chain links of the articulated arrangement can be connected for this with the aid of a spherical joint arrangement comprising a spherical segment and a spherical-shell segment. Within the meaning of an especially compact design for conveying chains according to an embodiment of the invention, it has proven useful if the spherical segment and the spherical-shell segment are attached to an insertion region on one of the chain links and, together with this insertion region, are accommodated in a holding region on the other chain link of the articulated arrangement.

For a secure connection between the chain links of the articulated arrangement, a connecting bolt that extends through the area accommodating the other chain link can extend through the spherical segment and the spherical-shell segment. In that case, the insertion region of the one chain link of the articulated arrangement, which carries the spherical segment and the spherical-shell segment, is initially inserted into the region for accommodating the other chain link during the installation. The connecting bolt is then guided through an opening extending through the spherical segment, the spherical-shell segment and the holding region so as to create a connection between the two chain links for which the spherical segment can be secured with the bolt, relative to the chain links provided with the holding region, while the spherical-shell segment together with the insertion region in the respective chain link can be pivoted around the spherical segment, thereby making it possible to pivot the chain link comprising the insertion region, relative to the chain link with the holding region.

For the purpose of achieving especially high wear resistance for the conveying chains according to an embodiment of the invention, it has proven advantageous if the spherical segment is made of metal while the spherical-shell segment can be composed of a plastic material with low friction coefficient, for example a polyamide or a Teflon-containing plastic. For the purpose of a particularly easy production, it is advantageous if the insertion region is embodied form-locking or material-to-material with the spherical-shell segment, such that the insertion region together with the spherical-shell segment is positioned so as to rotate relative to the spherical segment. The insertion region can be formed, for example, by insert-molding of the spherical-shell segment with a preferably fiber-reinforced plastic. The spherical-shell segment can be composed of pre-fabricated single-part, two-part or multi-part shells which are fitted around the spherical segment, wherein a centering means can be provided if necessary on the frontal surfaces of the partial shells which face each other. For the purpose of guiding the pivoting movement of the chain links, relative to the axis for the bolt connecting the insertion region with the holding region, the insertion region can be embodied as a circular segment of a disk surrounding the bolt axis, wherein the peripheral area of the holding region can also be embodied as a shell segment of a circular disk.

It is particularly easy to produce the conveying chains according to an embodiment of the invention while simultaneously avoiding an excess number of different components and by ensuring a corresponding positioning if one functional unit of the articulated arrangement is embodied as first chain link for the functional arrangement and the other functional unit of the articulated arrangement is embodied as second chain link of the functional arrangement.

With this embodiment of the invention, the individual functional units of the articulated arrangement can be connected securely and reliably while avoiding any influence on the connection between the drive unit and the conveying chain, provided the insertion region comprises a bolt that laterally connects the chain links and preferably also contains a projection that advantageously extends approximately along the conveying direction. The circular disk-shaped insertion region can be arranged in a plane, defined by the conveying direction and the screw-bolt axis, so as to ensure a sufficiently high rigidity in case of stress exerted by the loads attached thereto and normally are positioned below. At least one roller axis can extend through the holding region in that case, wherein the axis for the connecting bolt extends approximately parallel, preferably approximately co-linear, to the second roller axis while the first roller axis is arranged in the plane for the disk-segment shaped insertion region. In that case, the insertion region is arranged between the guide pins for the second functional element on which the guide rollers are mounted so as to rotate, relative to the first roller axis.

A conveying chain can thus be provided with successively positioned articulated arrangements and functional arrangements if respectively one first chain link is arranged between two second chain links. Each second chain link is connected on one side articulated to one of the first chain links and is connected on the other side rigidly to the other one of the first chain links.

BRIEF DESCRIPTION OF THE DRAWINGS

These and other features and advantages of the invention will be further understood from the following detailed description of some embodiments with reference to the accompanying drawings, in which.

DETAILED DESCRIPTION

Figure 1:
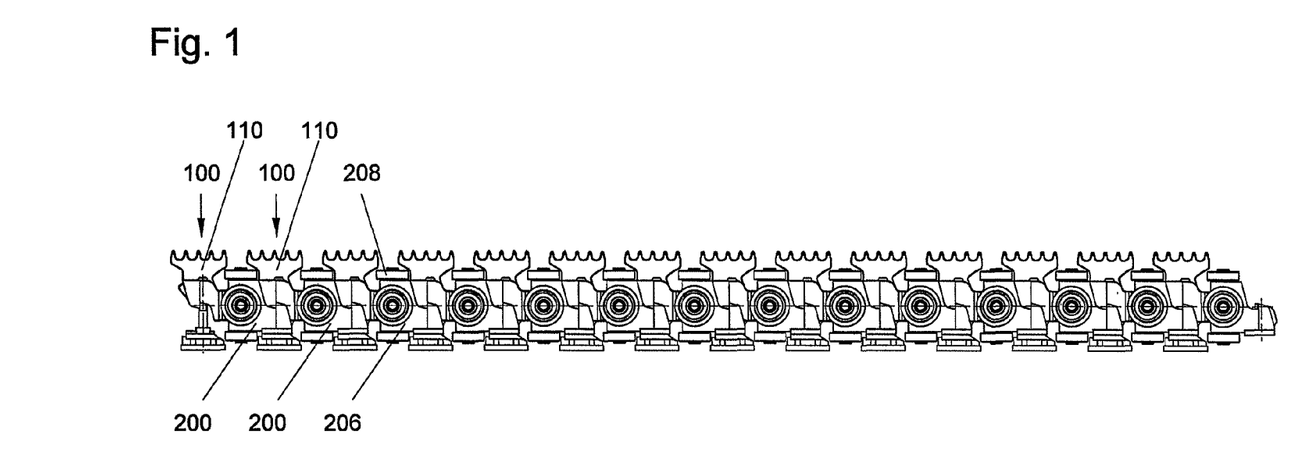
FIG. 1 A view from the side of a conveying chain according to an embodiment of the invention.
Figure 2:
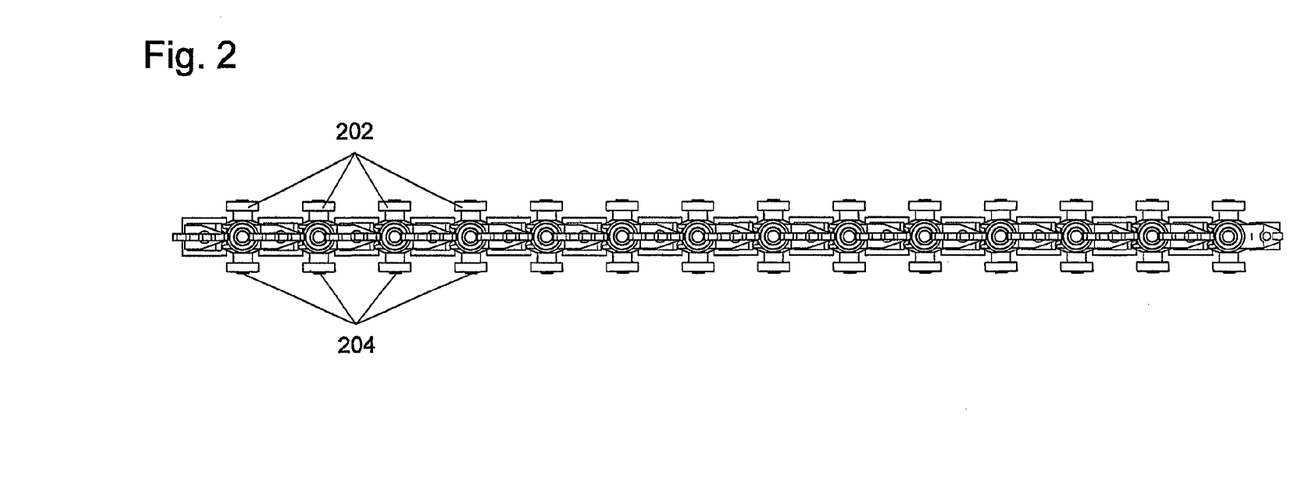
FIG. 2 A view from above of a conveying chain according to an embodiment of the invention.

According to an embodiment, a conveying chain shown in FIG. 1 comprises functional units in the form of first chain links 100 and second chain links 200. Each of the first chain links 100 is provided with a comb-shaped connecting region 110 for connecting the conveying chain to a drive chain 530 (see FIG. 11). As shown in the embodiment depicted in FIGS. 1 and 2, each of the second chain links 200 is provided with a total of four guide rollers 202, 204, 206, 208, wherein the guide rollers 206 and 208 are positioned rotating, relative to a first joint roller axis, and the guide rollers 202, 204 are positioned rotating, relative to a second joint roller axis. The first and the second roller axes extend perpendicular to each other and are arranged in one plane. Each of the first chain links 100 is arranged between two second chain links 200. To form a functional arrangement, each of the first chain links 100 is thus connected rigidly on one side with one of the second chain links 200 and is connected on the other side with the other one of the second chain links 200, so as to form an articulated arrangement.

Figure 3:
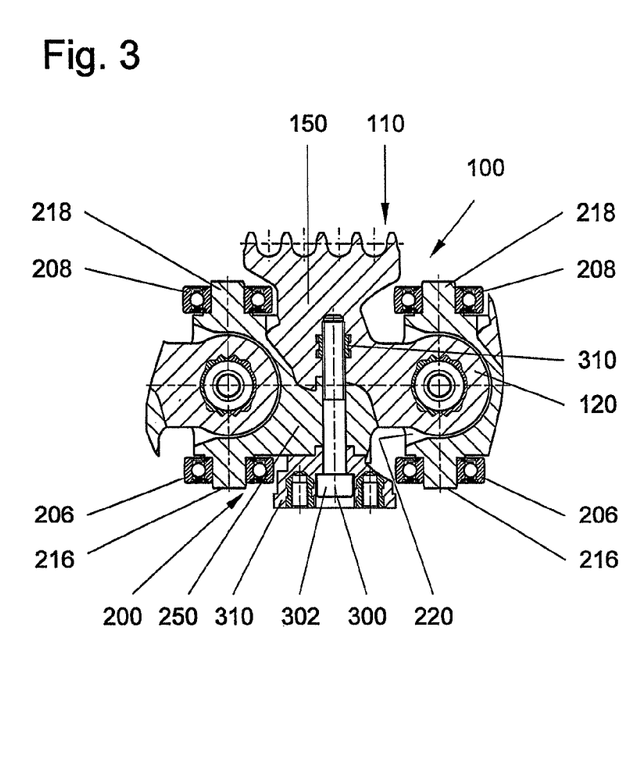
FIG. 3 A sectional representation of a functional arrangement of a conveying chain according to an embodiment of the invention.
Figure 9:
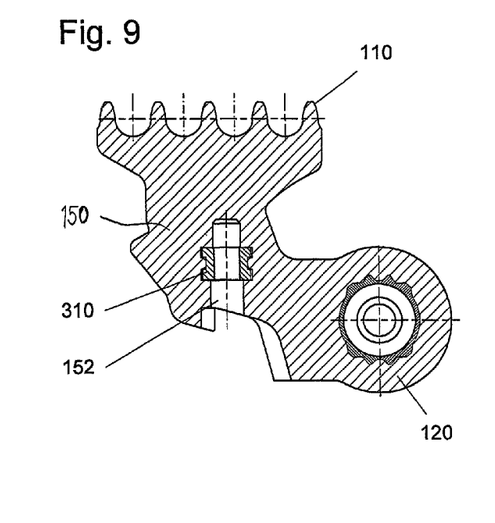
FIG. 9 A first sectional representation of the first functional element shown in FIGS. 4 and 8.

FIG. 3 illustrates the rigid connection between first chain links 100 and second chain links 200 which results in creating the functional arrangement. In order to connect the first chain links 100 to the second chain links 200, a screw bolt 300 is thus inserted and extends through a bore in a connecting region 250 of the second chain link 200 and is screwed into a connecting region 150 of the first chain link 100. A blind hole 152 (see FIGS. 5 and 9) is thus formed in the first chain link 100 with therein inserted thread insert 310 into which the bolt 300 is screwed. According to FIG. 5, the blind hole 152 is arranged below the comb-shaped connecting region 110. Following the connecting of the first chain link 100 and the second chain link 200, all guide rollers 202, 204, 206, 208 are arranged on the side of the comb-shaped connecting region 110 that faces the bolt head 302 of the screw bolt 300, so that the comb-shaped connecting region 110 outside of the guide rollers 202, 204, 206, 208 can be freely accessed. The bolt head 302 fits flush against the side of the second chain link 200 that is facing away from the comb-shaped connecting region 110, with a connecting device 310 disposed in-between. The connecting device 310 is used to attach functional units such as gripper elements or clamping elements to the conveying chain.

Figure 4:
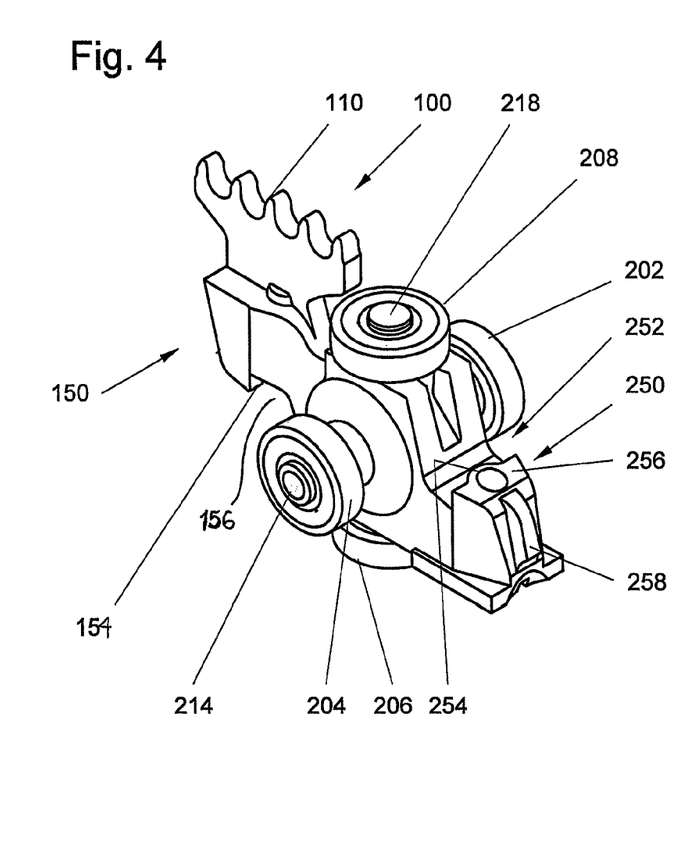
FIG. 4 A perspective representation of an articulated arrangement of a conveying chain according to an embodiment of the invention.

FIG. 4 shows that the connecting region 250 of the second chain link 200 is provided with a projection 256 and a grooved recess 252 into which a convex area 254 of the projection 256 extends. Complementary thereto, the connecting region 150 of the first chain link 100 is embodied with a projection 154 that engages in the grooved recess 252 and is provided with a recess 156 for accommodating the projection 256, wherein the projection 154 is furthermore provided with a concave area 155 (see FIG. 5) for accommodating the convex area 254, so that by inserting the connecting region 150 of the first chain link 100 into the connecting region 250 of the second chain link 200, a form-fitting connection is created between the first chain link 100 and the second chain link 200 which can be locked in place with the aid of the screw bolt 300 (see FIG. 3) that extends through the projection 256 and is inserted into the blind hole 152 (see FIG. 5) formed between the recess 156 and the comb-shaped connecting region 110 of the first chain link 100. To further secure the position of the form-locking connection between the first connecting region 150 and the second connecting region 250, the projection 256 is also provided with a hook-shaped engagement region 258 (see FIG. 4) which engages in a further depression 157 in the recess 156 (see FIG. 5).

Figure 11:
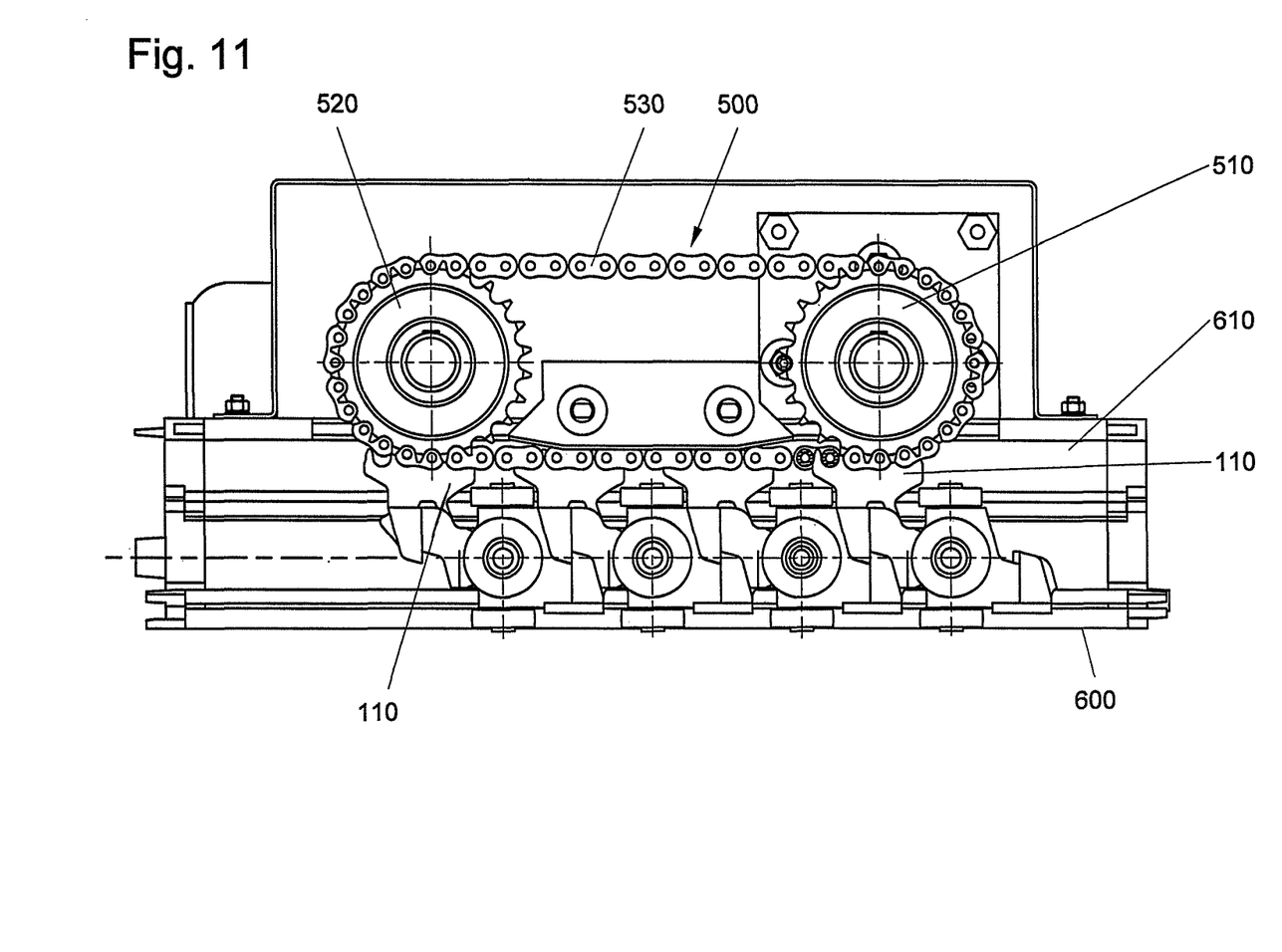
FIG. 11 A view from the side which shows the connection of a drive unit to a conveying chain according to an embodiment of the invention.

According to FIG. 3, the comb-shaped connecting region 110 is embodied in the manner of a comb having teeth that extend approximately parallel to the axis of the screw bolt 300, wherein an intermediate space exists between the teeth of the comb in which the chain bolts of the drive chain 530 engage (see FIG. 11). The guide rollers 202, 204, 206, 208 are positioned rotating on guide pins 212, 214, 216, 218, so that between the guide pins 212, 214, 216, 218 a structural space is still available for producing an articulated connection between first chain links 100 and second chain links 200. The articulated arrangement produced by connecting the first chain links 100 and the second chain links 200 is explained with the aid of FIGS. 3-6.

Figure 5:
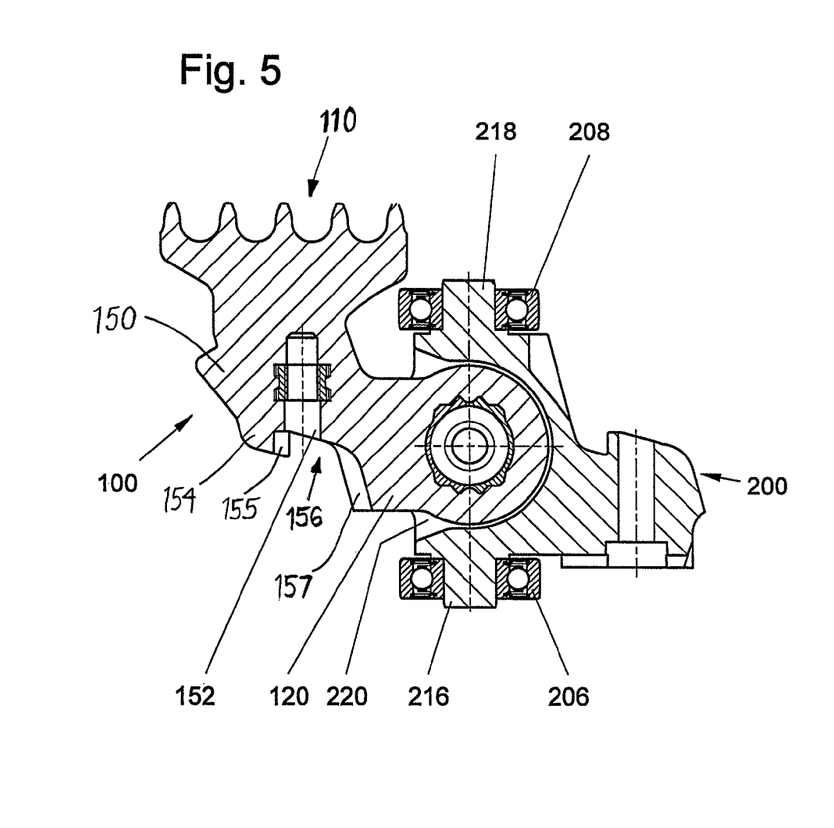
FIG. 5 A first sectional representation of an articulated arrangement of a conveying chain according to an embodiment of the invention.

According to FIGS. 4 and 5, the first chain link 100 is provided in conveying direction with an insertion region 120 that extends transverse to the bolt axis and is accommodated within a holding region 220 that is formed between the guide pins 212, 214, 216, 218 of the second chain link 200. The insertion region 120 takes the shape of a circular disk segment while the holding region 220 is embodied in the shape of a shell-type circular disk segment, so that a guide is formed by the peripheral areas of the insertion region 120 and the holding region 220 for a pivoting movement of the first functional element 100, relative to the second functional element 200, around a pivoting axis formed by the second roller axis.

Figure 6:
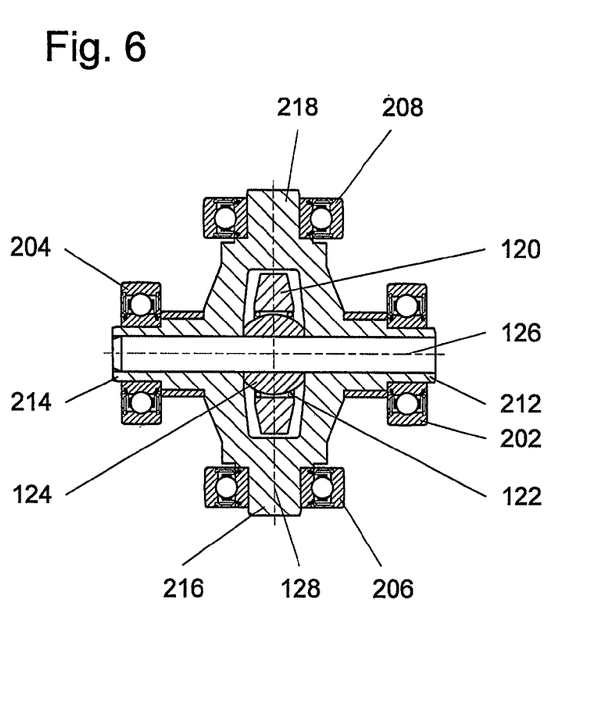
FIG. 6 A second sectional representation of an articulated arrangement of a conveying chain according to an embodiment of the invention.
Figure 10:
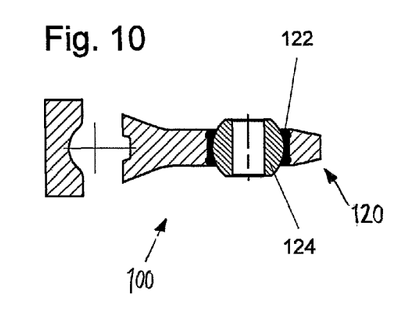
FIG. 10 A second sectional representation of the first functional element shown in FIGS. 4 and 8.

According to FIG. 6, the articulated connection between the first chain link 100 and the second chain link 200 contains a spherical segment 124, accommodated in the insertion region 120, wherein a sliding element 122 in the shape of a spherical-shell segment which is made of a plastic and has a low frictional coefficient is arranged between the spherical segment 124 and the outside area of the insertion region 120. The spherical segment 124 and the spherical-shell segment 122 extend through the insertion region 120. With the aid of the spherical-shell segment 122, the insertion region 120 which holds the spherical segment 124 is positioned such that it can rotate on the spherical segment 124 (see FIG. 10). Thus, following the insertion of the insertion region 120 into the holding region 220, the first chain link 100 with the insertion region 120 is consequently positioned rotating, relative to the axis for the connecting bolt 126 and an axis 128 that extends perpendicular thereto and parallel to the screw bolt 300, wherein the pivoting movement relative to the pivoting axis 128 is fixed by the width of the holding region 220 in the direction that is determined by the axis of the bolt 126. If necessary, this width can be increased.

Figure 7:
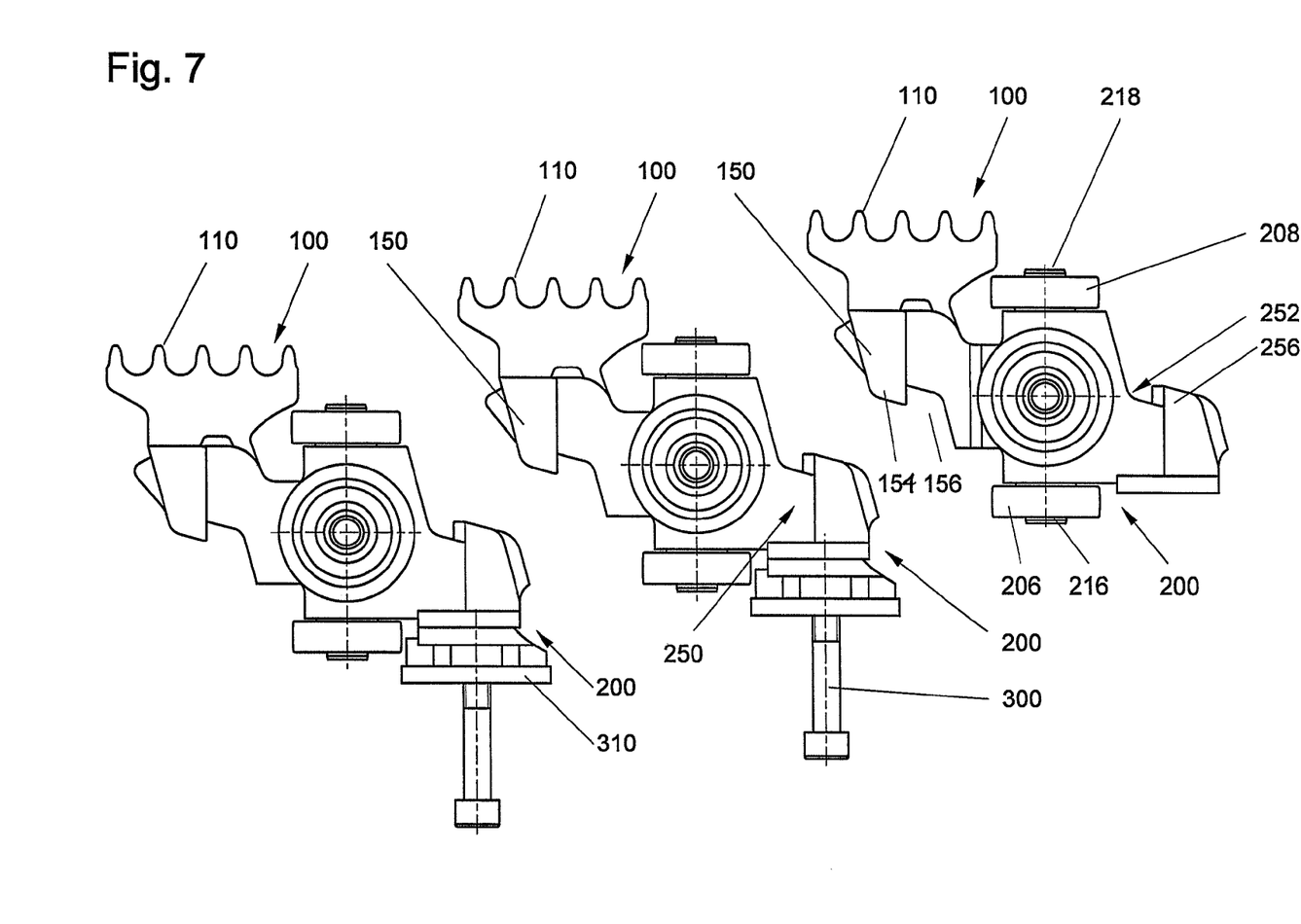
FIG. 7 A representation illustrating the installation of conveying chains according to an embodiment of the invention.

FIG. 7 shows an installed conveying chain according to an embodiment of the invention, wherein this Figure is explained in further detail below.

Figure 8:
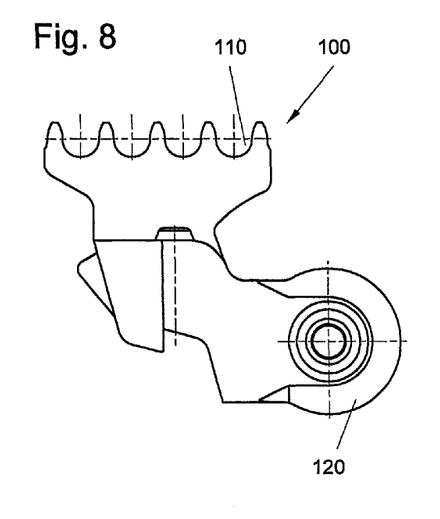
FIG. 8 A view from the side of a first functional element of the conveying chains according to an embodiment of the invention.

In FIG. 8, the first chain link 100 is shown in further detail including the comb-shaped connecting region 110 and the insertion region 120. According to FIG. 10, the insertion region 120 on the first chain link 100 is embodied by partially enveloping the spherical segment 124 with a plastic material having low friction in order to form a spherical-shell segment 122, wherein the spherical segment 124 formed in this way can be produced by surrounding it with an injection-molded coat of plastic, especially a fiber-reinforced plastic, to form the insertion region 120. The spherical-shell segment 122 is embodied as one piece, but can also consist of two parts or several parts. During the injection-molding process, the connecting region 150 and the comb-shaped connecting region 110 can furthermore be formed at the same time, wherein it is also conceivable during the injection-molding process to insert the threaded insert 310 into the blind hole 152 (see FIG. 9). According to the embodiment depicted in FIG. 7, the conveying chains can be installed by first pre-assembling articulated arrangements or functional units consisting of first chain links (functional elements) 100 and second chain links (functional elements) 200, which are then fitted together in the connecting regions 150 and/or 250 and are subsequently locked into place with the aid of the screw bolts 300. The depicted sequence includes three sequentially arranged functional units. The first and the second units (from left to right) are the same and define a "congruent" sequence. The third unit includes a difference in that this unit does not include a connecting device 310. Thus, the sequence including the third unit can be called "quasi-congruent."

According to an embodiment of the invention depicted in FIG. 11, the conveying chains can convey along a section formed by a guide rail arrangement 600, wherein the conveying chain is accommodated inside the guide rail 600 and is moved with the aid of guide rollers 202, 204, 206, 208 along corresponding running surfaces of the guide rail 600. The comb-shaped connecting regions 110 are located in a drive space 610 for the guide rails 600 and engage in drive sections of the guide rail arrangement 600 in a drive chain 530 of a drive unit 500 which moves around two chain wheels 510 and 520. To connect the drive unit 500, it is only necessary to produce a recess in a peripheral area of the drive space 610 through which the drive chain 530 can move into the comb-shaped connecting regions 110.

Figure 12:
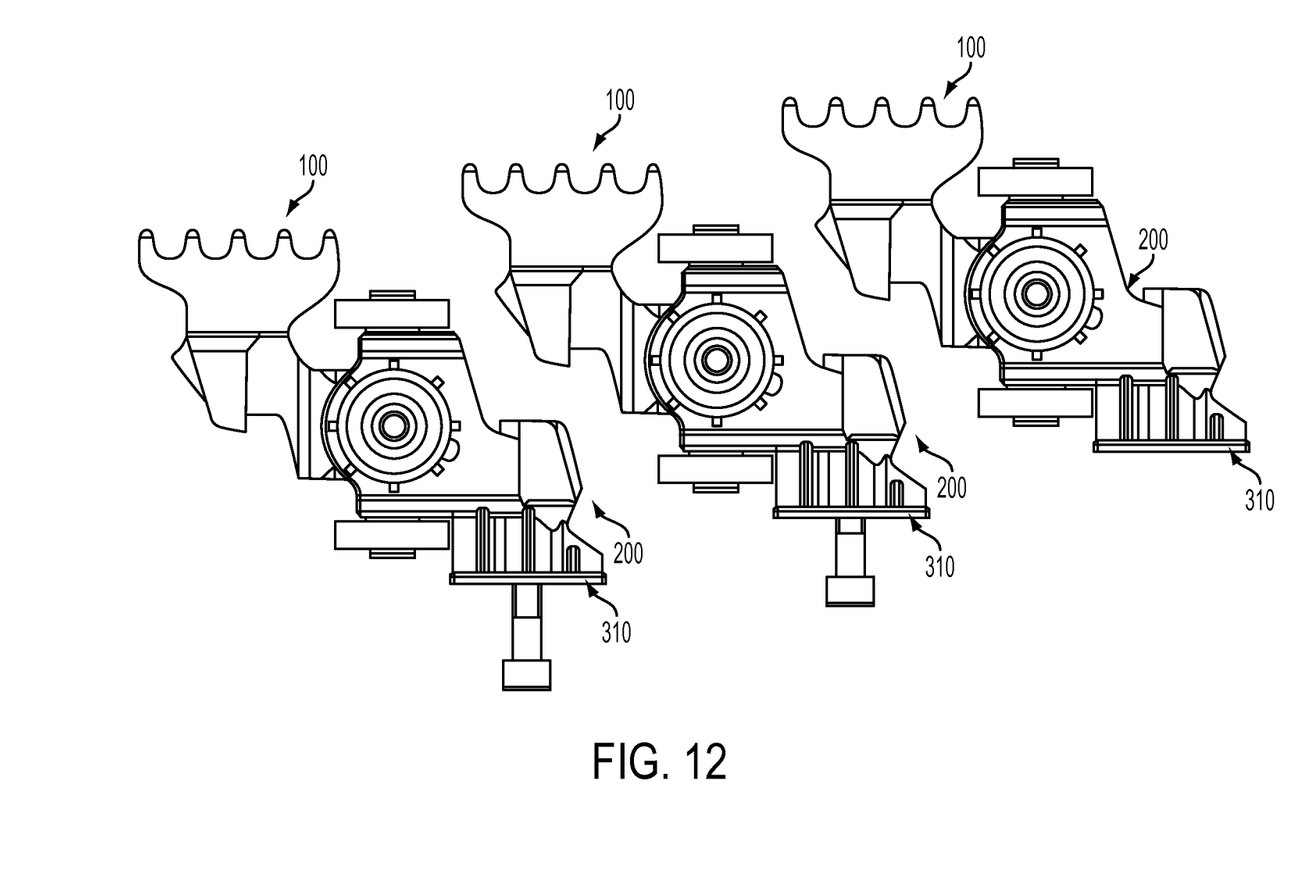
FIG. 12 A representation illustrating the installation of conveying chains according to another embodiment of the invention.

According to the embodiment depicted in FIG. 12, the conveying chains can be installed by first pre-assembling articulated arrangements or functional units consisting of first chain links 100 and second chain links 200, which are then fitted together and are subsequently locked into place with the aid of the screw bolts. The depicted sequence includes three sequentially arranged identical functional units, each including a connecting device 310, and defining a congruent sequence.

Figure 13:
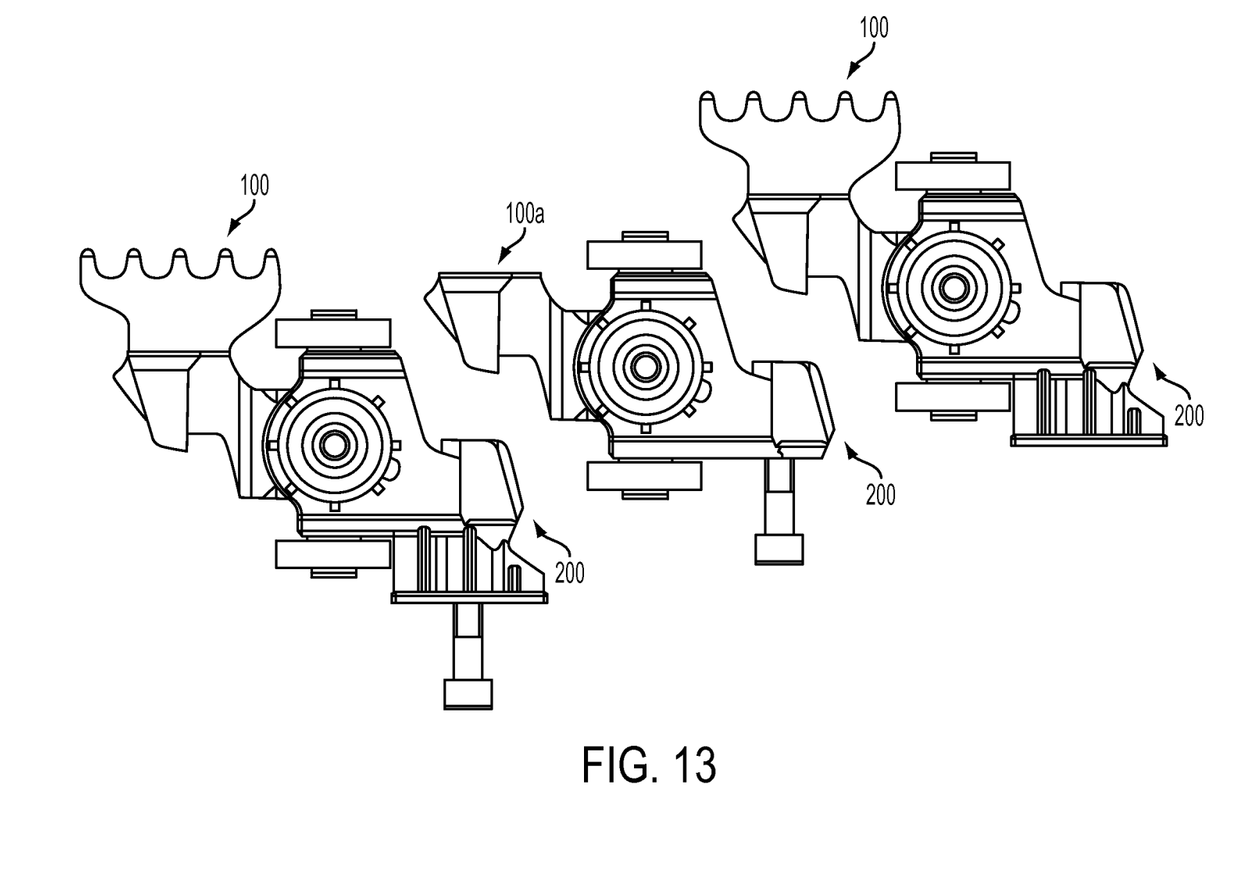
FIG. 13 A representation illustrating the installation of conveying chains according to yet another embodiment of the invention.

According to the embodiment depicted in FIG. 13, the conveying chains can be installed by first pre-assembling articulated arrangements or functional units consisting of first chain links 100 and second chain links 200 or first chain links 100a and second chain links 200, which are then fitted together and are subsequently locked into place with the aid of the screw bolts. The depicted sequence includes three sequentially arranged functional units. The first and third units (from left to right) are the same. The second unit includes a difference in that this unit does not include, for example, a comb-shaped connecting region 110 on the first chain link 100a or a connecting device 310 attached to second chain link 200.

The invention is not restricted to the embodiment explained with the aid of the drawings. Rather, it can conceivably also be used for conveying chains with differently designed guide rail arrangements, having three or fewer guide rollers, guide pins or the like. The connecting regions of the conveying chain can furthermore be embodied differently, wherein a cardanic connection between the individual chain links is also conceivable when forming articulated arrangements.

Figure 14:
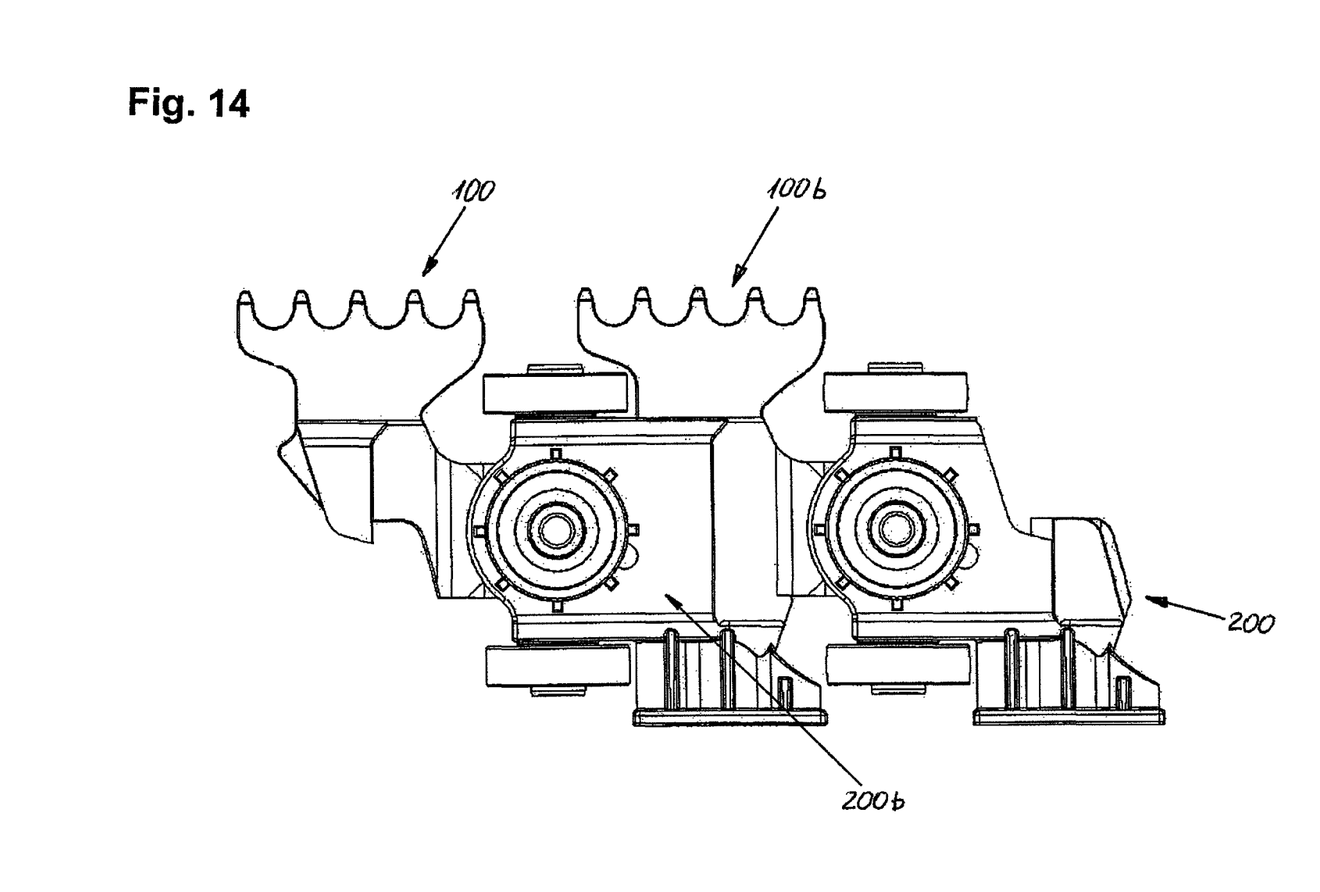
FIG. 14 A representation illustrating the installation of conveying chains according to still another embodiment of the invention.

A number of options are possible within the scope of the invention. In particular, functional units that consist of respectively a first and a second operatively connected chain links 100, 200, as previously explained, can be configured with a congruent (see FIG. 12) or quasi-congruent (see FIG. 7) sequence or the like (see FIG. 13), or can also have different functionality (see FIG. 13). Of course, the different functions of the two chain links as well as the connecting options relative to each other are maintained. It is also possible that a second chain link does not always immediately follow a first chain link, for example, but that two or more second chain links follow a first chain link, or vice versa, namely that two or more first chain links are connected successively. The sequentially arranged functional units in that case are provided with means or connecting elements for a detachable connection or a conditionally detachable connection due to traction or a non-detachable connection. It means on the one hand that the geometric and functional embodiment of the individual guide units does not have to be uniform over the complete conveying chain and that variations in-between are possible which depend on the operation. On the other hand, it is emphasized that the functional units used to form the conveying chain can also be connected differently, relative to each other, wherein a detachable connection such as a screw connection will for the most part be selected in that case. However, if necessary a frictional connection which functions in the manner of a detachable connection can also be provided. Finally, there is the option of creating a non-detachable connection between the individual functional units, e.g. a welded connection between a second chain link 200b and a first chain link 100b of consecutive pre-assembled functional units (see FIG. 14).

What is claimed is:
1. A transport device for conveying printed products, comprising:
  a conveying chain including at least two functional units arranged sequentially along a conveying section and connected to each other by a connecting element, wherein each functional unit comprises:
a first chain link; and
a second chain link operatively connected to the first chain link, wherein the first and second chain links differ in their respective functions;
wherein at least one of only the first chain links includes a connecting region configured to connect the conveying chain to a drive unit, and wherein only the second chain links include at least one guide device configured to guide the conveying chain along a guide rail arrangement.

2. The transport device according to claim 1, wherein the at least one guide device comprises four guide rollers, wherein a first pair of the guide rollers is positioned to rotate relative to a first roller axis extending substantially perpendicular to a direction of the conveying section, and wherein a second pair of the guide rollers is positioned to rotate relative to a second roller axis extending substantially perpendicular to a plane defined by the conveying direction and the first roller axis.

3. The transport device according to claim 2, wherein the first pair of guide rollers is positioned substantially perpendicular to the conveying direction, and wherein the second pair of guide rollers is positioned substantially parallel to the conveying direction.

4. The transport device according to claim 2, wherein the first guide rollers are positioned in the plane defined by the first roller axis and the conveying direction, and wherein the second guide rollers are positioned in another plane defined by the second roller axis and the conveying direction, the planes positioned substantially perpendicular to each other.

5. The transport device according to claim 2, wherein the first and second chain links are connected to each other with a ball-joint arrangement comprising a spherical segment and a spherical-shell segment, wherein the spherical segment and the spherical-shell segment are attached to an insertion region of the first chain link and are accommodated together with the insertion region in a holding region of the second chain link, and wherein at least one of the first and second roller axes extends through the holding region.

6. The transport device according to claim 5, further comprising a connecting bolt extending through the holding region of the second chain link and through the spherical segment and the spherical-shell segment, wherein an axis of the connecting bolt extends approximately parallel to the roller axis extending through the holding region.

7. The transport device according to claim 6, wherein the axis of the connecting bolt extends approximately co-linear with the roller axis extending through the holding region.

8. The transport device according to claim 1, wherein a detachable connection between the first chain link and the second chain link is arranged on a side of the functional unit facing away from the connecting region.

9. The transport device according to claim 1, wherein a detachable connection between the first chain link and the second chain link comprises a screw bolt.

10. The transport device according to one of the claim 1, wherein the first and second chain links are pivotably coupled to each other around at least two pivoting axes.

11. The transport device according to claim 10, wherein the first and second chain links are connected to each other with a ball-joint arrangement comprising a spherical segment and a spherical-shell segment.

12. The transport device according to claim 11, wherein the spherical-shell segment comprises a single-part, two-part, or multi-part spherical-shell segment.

13. The transport device according to claim 1, wherein the functional units are arranged in a substantially congruent sequence.

14. The transport device according to claim 1, wherein the connecting element connecting the functional units defines one of a detachable connection, a conditionally detachable connection due to traction, or a non-detachable connection.

15. A transport device for conveying printed products, comprising:
a conveying chain including at least two functional units arranged sequentially along a conveying section and connected to each other by a connecting element, wherein each functional unit comprises:
a first chain link; and
a second chain link operatively connected to the first chain link, wherein the first and second chain links differ in their respective functions, wherein the first and second chain links are connected to each other with a ball-joint arrangement comprising a spherical segment and a spherical-shell segment, and the spherical segment and the spherical-shell segment are attached to an insertion region of the first chain link and are accommodated together with the insertion region in a holding region of the second chain link.

16. The transport device according to claim 15, further comprising a connecting bolt extending through the holding region of the second chain link and through the spherical segment and the spherical-shell segment.

17. The transport device according to claim 16, wherein the insertion region comprises a segment of a circular disk that surrounds the connecting bolt.

18. The transport device according to the claim 16, wherein the insertion region includes a projection extending substantially transverse to the connecting bolt and approximately along the conveying section.

19. The transport device according to claim 18, wherein a detachable connection between the first chain link and the second chain link comprises a screw bolt, and wherein the insertion region extends in a plane defined by the conveying direction and an axis of the screw bolt.

20. The transport device according to claim 15, wherein the spherical segment comprises a metal material, and wherein the spherical-shell segment comprises a plastic material with low frictional coefficient, and wherein the insertion region is embodied form-locking or material-to-material with the spherical-shell segment, whereby the insertion region together with the spherical-shell segment is positioned to rotate relative to the spherical segment.

21. The transport device according to claim 20, wherein the insertion region comprises a plastic or fiber-reinforced plastic material injection-molded around the spherical-shell segment.

22. A transport device for conveying printed products, comprising:
a conveying chain including at least two functional units arranged sequentially along a conveying section and connected to each other by a connecting element, wherein each functional unit comprises:
a first chain link; and
a second chain link operatively connected to the first chain link, wherein the first and second chain links differ in their respective functions, wherein at least one of the first chain links is arranged between two of the second chain links, and wherein the first chain link is pivotably connected on one side with one of the second chain links and on another side is rigidly connected with the other of the second chain links.

23. A transport device for conveying printed products, comprising:
- a conveying chain including at least two functional units arranged sequentially along a conveying section and connected to each other by a connecting element, wherein each functional unit comprises:
- a first chain link; and
- a second chain link operatively connected to the first chain link, wherein the first and second chain links differ in their respective functions, wherein at least one of the second chain links is arranged between two of the first chain links, and wherein the second chain link is pivotably connected on one side with one of the first chain links and is rigidly connected on another side with the other of the first chain links.

24. A transport device for conveying printed products, comprising:
- a conveying chain including at least two functional units arranged sequentially along a conveying section and connected to each other by a connecting element, wherein each functional unit comprises:
- a first chain link; and
- a second chain link operatively connected to the first chain link, wherein the first and second chain links differ in their respective functions, wherein the first chain link includes a connecting region configured to connect the conveying chain to a drive unit, and wherein the second chain link includes at least one guide device configured to guide the conveying chain along a guide rail arrangement, and the connecting region comprises a comb-shaped portion having teeth that extend substantially perpendicular to a direction of the conveying section.

* * * * *